United States Patent [19]

Turocy

[11] 4,008,611
[45] Feb. 22, 1977

[54] FLUID FLOW MEASURING APPARATUS

[75] Inventor: Elmer W. Turocy, Bridgeville, Pa.

[73] Assignee: S. P. Kinney Engineers, Inc., Carnegie, Pa.

[22] Filed: July 1, 1975

[21] Appl. No.: 592,108

[52] U.S. Cl. .............................................. 73/205 R
[51] Int. Cl.[2] .......................................... G01F 1/37
[58] Field of Search ................. 73/205 R, 211, 228, 73/421.5 A, 194 R

[56] References Cited
UNITED STATES PATENTS

| | | | |
|---|---|---|---|
| 1,946,319 | 2/1934 | Hodgson et al. | 73/211 |
| 2,687,645 | 8/1954 | Velten et al. | 73/211 |
| 2,927,462 | 3/1960 | Li | 73/228 |
| 3,875,797 | 4/1975 | Zweng | 73/194 R |

Primary Examiner—Richard C. Queisser
Assistant Examiner—Stephen A. Kreitman
Attorney, Agent, or Firm—Parmelee, Miller, Welsh & Kratz

[57] ABSTRACT

Apparatus for producing a pressure differential for measuring flow of a gaseous fluid through a conduit of circular cross-section, including a pair of hollow tubes which pass through the wall of the conduit and have open inner ends which are parallel and confronting. Support means are mounted between the tubes which support a circular plate of diameter less than the diameter of the conduit. The circular plate lies in a plane which is perpendicular to the axis of the conduit, and is also parallel to and between the open ends of the tubes. Air or gas passing through the conduit impinges upon the circular plate and causes a measurable pressure differential between the two tubes.

4 Claims, 5 Drawing Figures

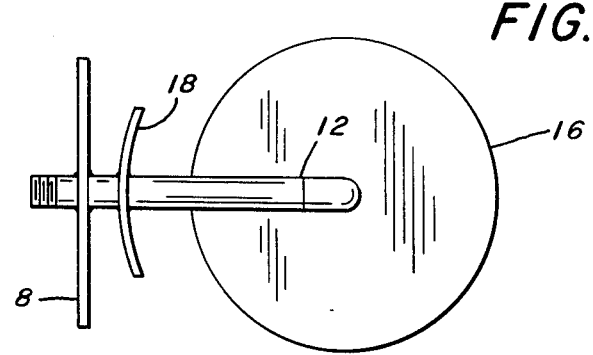
FIG. 3.
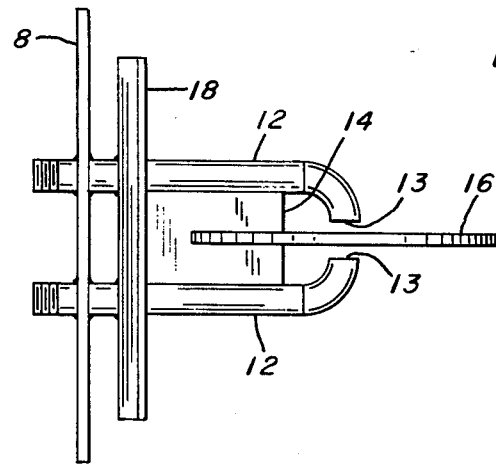
FIG. 4.
FIG. 5.
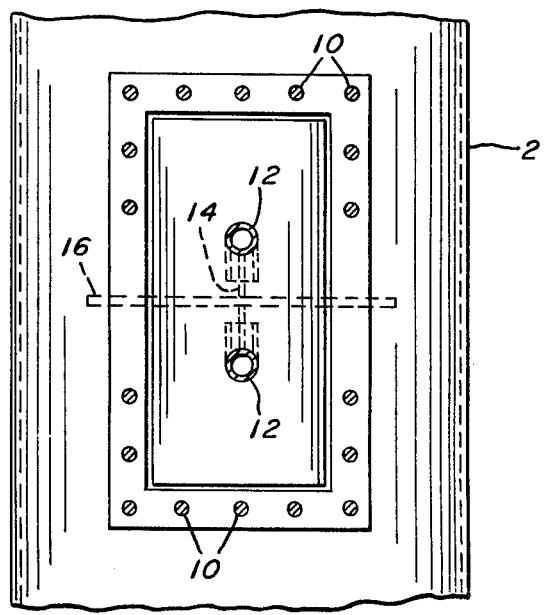

FLUID FLOW MEASURING APPARATUS

BACKGROUND OF THE INVENTION

1. Field of the Invention

This invention relates generally to apparatus for measuring the flow of gas or air through a conduit, and more specifically to such apparatus for use in the gas or air mains of a blast furnace.

2. Prior Art

It has been known in the field of fluid flow measurement that the flow of gas or air through a conduit may be measured by creating an orifice in the conduit through which all of the fluid in the conduit must flow, and locating a pair of pressure differential tubes, or impulse tubes, on opposite sides of the orifice. Apparatus is connected to the tubes for measuring the pressure differential in the tubes created by the flow of fluid through the orifice. This pressure differential may then be converted into a measurement of the rate of flow of the fluid through the conduit. One apparatus of this type in which the ends of the tubes are located in the side of the conduit is disclosed in U.S. Pat. No. 2,927,462. In the type of apparatus disclosed in that patent, the orifice is created in the center of a plate which is mounted in the conduit. Another type of pressure differential producing apparatus is disclosed in U.S. Pat. No. 2,687,645. In that patent an annular opening is formed in a plate which is mounted in the conduit, and the pressure differential tubes are mounted such that the open ends of the tubes are located in close proximity to opposite sides of the center of the orifice plate. In apparatus of the type shown in U.S. Pat. No. 2,687,645, it has been found that the spokes which connect the circular center portion of the plate to the annular outer portion of the plate interfere with the air flow and thus limit the accuracy of the flow readings obtainable. Also, the orifice plate in an apparatus of this type is mounted between flanges in the conduit, and the tubes are mounted directly in the walls of the conduit. In this arrangement, it is not feasible to remove the orifice plate and tubes for inspection of the apparatus and it is, therefore, necessary to provide an inspection window in the conduit for this purpose. In addition, because the orifice plate and the tubes are mounted separately in the conduit, it is difficult to ensure the close tolerances necessary in the placement of the open ends of the tube proximate the center of the orifice plate.

The present invention eliminates the multiple spoke supports holding the circular center plate, and thus reduces or eliminates the variable turbulances caused by the supports. The elimination of such supports also allows for use of a single plate with a maximum circular sharp-edge exposure to the fluid flow for increased accuracy of measurement. The integral mounting of the tubes and plates provides for accurate, positive and permanent impulse tube settings in relation to the orifice plate and allows the apparatus to be installed in a short pipe section or elbow. The lowered turbulance factor permits a higher downstream pressure recovery rate and eliminates the need for extra straight lengths of main pipe required by the conventional, adjustable type impulse tubes. Thus the present apparatus allows for uniform pressure differential readings through a full range of flow rates. The assembly can also be easily removed from the conduit, eliminating the need for inspection openings in the conduit.

SUMMARY OF THE INVENTION

The present invention is an apparatus for producing a pressure differential for measuring flow of a gaseous fluid through a conduit of circular cross-section. A pair of hollow tubes are secured to the conduit, with the axes of the tubes being located in a half plane which extends from and is perpendicular to the axis of the conduit. Each of the tubes passes from without to within the conduit, and the inner ends of the tubes are open, parallel, confronting and perpendicular to the axis of the conduit. Support means are mounted inside the conduit between the hollow tubes. The support means support a circular plate having a diameter less than the diameter of the conduit, and lying in a plane perpendicular to the axis of the conduit and also parallel to and between the open ends of the tubes. The center of the circular plate is located on the axis of the conduit. The apparatus is preferably mounted in the conduit by providing a mounting flange attached to the conduit around an opening in the conduit and a mounting plate attached to the hollow tubes which is removably attachable to the mounting flange. When the mounting plate is attached to the mounting flange, the hollow tubes and circular plate are secured in the conduit in their operative positions, and when the mounting plate is detached from the mounting flange, the hollow tubes and circular plate may be completely removed from the conduit. A plate of arcuate cross-section may also be provided which is sized and shaped to fit in the opening in the conduit. The arcuate plate is secured to the hollow tubes such that when the mounting plate is attached to the mounting flange, the arcuate plate substantially closes the opening in the conduit and completes the circular cross-section of the conduit.

BRIEF DESCRIPTION OF THE DRAWINGS

FIG. 3 is a plan view of the hollow tube and circular plate assembly with the attached mounting plate and arcuate plate;

FIG. 4 is a side elevation view of the apparatus shown in FIG. 3; and

FIG. 5 is a sectional front elevation view taken along the line V—V of FIG. 1 showing the apparatus of the present invention in phantom mounted in the conduit.

DETAILED DESCRIPTION OF THE PREFERRED EMBODIMENTS

Figure 1:
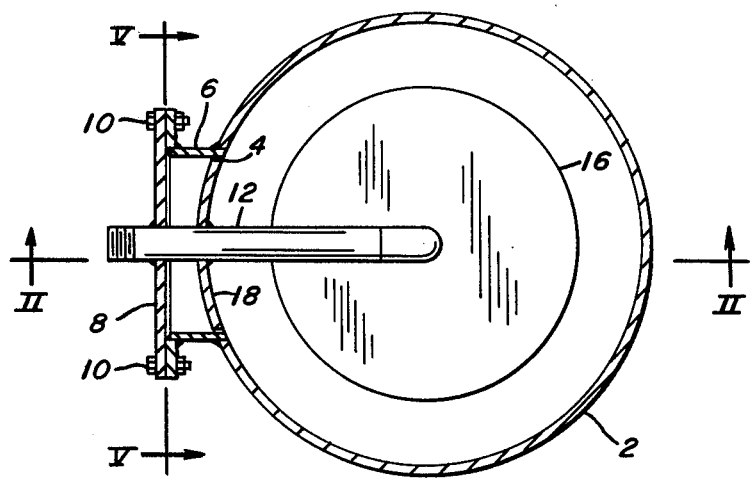
FIG. 1 is a sectional plan view of the conduit taken along the line I—I of FIG. 2 showing the apparatus of the present invention mounted in the conduit.
Figure 2:
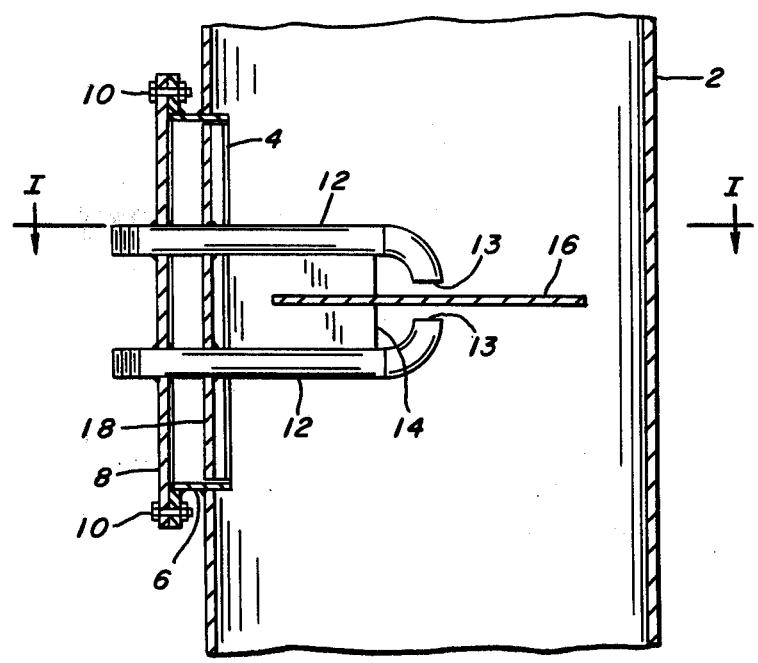
FIG. 2 is a sectional side elevation view taken along the line II—II of FIG. 1 showing the apparatus of the present invention mounted in the conduit.

Referring to FIGS. 1 and 2, a portion of a conduit 2 is shown which may be, for example, a gas or air main in a blast furnace. An opening 4 is provided in the conduit. This opening 4 may be rectangular, as shown in the drawings, or may be of some other shape. A mounting flange 6 is integrally attached to the conduit 2, such as by welding, and surrounds the opening 4 in the conduit 2. A mounting plate 8 is removably attached to the mounting flange 6, such as by bolts 10. A pair of hollow tubes 12, also known as impulse tubes, are mounted to the mounting plate 8, such as by welding, so that they pass through the mounting plate 8 and thus pass from within to without the conduit 2. The outer ends of the tubes 12 are adapted to be attached to differential pressure measuring apparatus, such as is well known in the art and is not shown in the drawings. The inner ends 13 of the tubes 12 are open and parallel to each other in a confronting relationship, the openings being located on and perpendicular to the axis of the conduit 2. This relationship of the open ends of the tubes 12 may be achieved by having a bend in the tubes 12, as shown in FIGS. 2 and 4, or by having straight tubes 12 mounted to the mounting plate 8 at an angle, with the ends of the tubes 12 being angularly cut so as to provide the parallel, confronting ends. In either arrangement, the axes of the tubes 12 are located in a half plane which extends from and is perpendicular to the axis of the conduit 2.

Support means, such as a flat support plate 14, is mounted between the impulse tubes 12. This support plate 14 is preferably in the same half plane as the axes of the tubes 12 and is welded to the tubes 12 so as to provide for an integral assembly. A circular plate 16, having a diameter less than the diameter of the conduit 2, is attached to and supported by the support plate 14, such as by being integrally welded to the support plate 14. The circular plate 16 is located in a plane perpendicular to both the plane of the support plate 14 and the axis of the conduit 2. The circular plate 16 is also parallel to and centered between the open ends of the impulse tubes 12 with the center of the circular plate 16 being located on the axis of the conduit 2. Other support means, such as bars connecting the tubes and supporting the circular plate, may be used, so long as the support means does not extend beyond the space between the tubes so as to interfere with the fluid flow.

The assembly of the mounting plate 8, the hollow tubes 12, the support plate 14, and the circular plate 16 form an integral assembly which is welded together so that the circular plate 16 and the open inner ends of the tubes 12 are in a permanent fixed relationship, allowing for close tolerances and increased accuracy of measurement by the apparatus. Preferably, a plate of arcuate cross-section 18 is attached to the hollow tubes, such as by welding, and may also be attached to the support plate 14. When the mounting plate 8 is bolted to the mounting flange 6, this arcuate plate 18 fits into the opening 4 in the conduit 2 and serves to provide a continuous surface inside the conduit 2 and completes the circular cross section of the conduit 2. The arcuate plate 18 thus eliminates the variation in size of the conduit 2 which would occur at the opening 4 and prevents the turbulance that the opening 4 would otherwise cause.

As shown in FIG. 5, the opening 4 in the conduit 2 is preferably longer in at least one dimension than the diameter of the circular plate 16. This allows for the removal of the tubes and the circular plate assembly from the conduit 2 by unbolting the mounting plate 8 from the mounting flange 6 and turning the assembly such that it can be removed from opening 4.

From the above description, the operation of the invention can be readily understood. Air or gas flowing through the conduit 2 impinges upon the circular plate 16 and passes through the annular opening formed between the circular plate 16 and the wall of the conduit 2. This flow around the circular plate 16 creates a pressure differential at the openings of the tubes 12 on opposite sides of the circular plate 16, which pressure differential can be read by the apparatus attached to the outer ends 13 of the tubes 12. This pressure differential can then be converted into a measurement of the rate of fluid flow through the conduit 2. The circular plate 16 is preferably sharp edged and flat so as to provide for the greatest accuracy of the apparatus. Since there are no supports holding the circular plate 16 at any point other than between the impulse tubes 12, maximum circular sharp-edged exposure is provided with the only turbulance occurring at the location of the impulse tubes 12. This maximum circular sharp-edged exposure and minimum turbulance allows for more uniform pressure differential readings through a full range of flow rates. Maximum accuracy is also achieved by the precise tolerances which may be established in the relationship of the open ends of the hollow tubes 12 and the surface of the circular plate 16. Since the entire tube and plate assembly is welded as a unit, these tolerances can be permanently established when the apparatus is assembled.

There has been described a novel and improved apparatus for producing a pressure differential for measurement of fluid flow through a conduit. The design of the apparatus provides for easy assembly and removal for inspection purposes. It also provides for a low turbulance factor which permits a higher downstream pressure recovery rate and eliminates the need for extra straight lengths of main pipe required by the conventional adjustable type impulse tubes. The removal of the apparatus from the conduit is easily and quickly achieved by unbolting the apparatus from the conduit, which eliminates the need for double flanges in the main to hold the orifice plate as in conventional assemblies, and eliminates the need of jacking devices to spread these flanges for installation or removal of the apparatus.

I claim:

1. Apparatus for producing a pressure differential for measuring flow of a gaseous fluid through a conduit of circular cross-section, comprising:
    a pair of hollow tubes secured to the conduit, the axes of the tubes being located in a half plane which extends from and is perpendicular to the axis of the conduit, each of said tubes passing from without to within the conduit, the inner ends of said tubes being open, parallel, confronting, and perpendicular to the axis of the conduit;
    a support plate attached to and between the tubes in the half plane of the axes of the tubes; and
    a circular plate, having a diameter less than the diameter of the conduit, attached to and supported by the support plate, lying in a plane perpendicular to the axis of the conduit, and parallel to and between the open ends of the tubes, the center of the plate being on the axis of the conduit.

2. The apparatus for producing a pressure differential for measuring flow of a gaseous fluid through a conduit of circular cross-section as defined in claim 1, including:
    a mounting flange attached to the conduit around an opening in the conduit; and
    a mounting plate attached to the hollow tubes and removably attachable to the mounting flange,
    whereby when the mounting plate is attached to the mounting flange, the hollow tubes and circular plate are secured in the conduit in their operative position, and when the mounting plate is detached from the mounting flange, the hollow tubes and circular plate may be completely removed from the conduit.

3. The apparatus for producing a pressure differential for measuring flow of a gaseous fluid through a conduit of circular cross-section as defined in claim 2, including:
- a plate of arcuate cross-section sized and shaped to fit in an opening in the conduit, and secured to the hollow tubes such that when the mounting plate is attached to the mounting flange, the arcuate plate substantially closes the opening in the conduit and completes the circular cross-section of the conduit.

4. Apparatus for producing a pressure differential for measuring flow of a gaseous fluid through a conduit of circular cross-section, comprising:
- a pair of hollow tubes secured to the conduit, the axes of the tubes being located in a half-plane which extends from and is perpendicular to the axis of the conduit, each of said tubes passing from without to within the conduit, the inner ends of said tubes being open, parallel, confronting, and perpendicular to the axis of the conduit;
- a flat support plate attached to and between the tubes in the half plane of the axes of the tubes;
- a circular plate, having a diameter less than the diameter of the conduit, attached to and supported by the support plate, lying in a plane perpendicular to the axis of the conduit, and parallel to and between the open ends of the tubes, the center of the plate being on the axis of the conduit;
- a mounting flange attached to the conduit around an opening in the conduit;
- a mounting plate attached to the hollow tubes and removably attachable to the mounting flange, such that when the mounting plate is attached to the mounting flange, the hollow tubes and circular plate are secured in the conduit in their operative position, and when the mounting plate is detached from the mounting flange, the hollow tubes and circular plate may be completely removed from the conduit; and
- a plate of arcuate cross-section, sized and shaped to fit in the opening in the conduit, and secured to the hollow tubes such that when the mounting plate is attached to the mounting flange, the arcuate plate substantially closes the opening in the conduit and completes the circular cross-section of the conduit.

* * * * *